United States Patent [19]
Croket

[11] Patent Number: 6,093,315
[45] Date of Patent: Jul. 25, 2000

[54] SEALING ARRANGEMENT FOR FILTER BELT

[75] Inventor: Frank M. Croket, Jefferson County, Ky.

[73] Assignee: Advanced Filtration Concepts, Louisville, Ky.

[21] Appl. No.: 09/035,569

[22] Filed: Feb. 19, 1998

[51] Int. Cl.[7] .......................... B01D 33/056; B01D 29/09; B23Q 11/00
[52] U.S. Cl. .......................... 210/168; 210/196; 210/297; 210/387; 210/400; 210/401
[58] Field of Search .................................. 210/400, 401, 210/387, 297, 168, 416.5, 196

[56] References Cited

U.S. PATENT DOCUMENTS

| | | |
|---|---|---|
| 3,464,557 | 9/1969 | Fowler . |
| 3,899,426 | 8/1975 | Hirs . |
| 4,137,169 | 1/1979 | El-Hindi . |
| 4,145,288 | 3/1979 | Crowe . |
| 4,147,635 | 4/1979 | Crowe . |
| 4,159,948 | 7/1979 | Crowe ..................................... 210/111 |
| 4,390,428 | 6/1983 | Bratten ................................... 210/400 |
| 4,421,647 | 12/1983 | Estabrook et al. ...................... 210/387 |
| 4,481,108 | 11/1984 | Bratten ................................... 210/137 |
| 4,693,836 | 9/1987 | Willson . |
| 5,089,143 | 2/1992 | Anderson . |
| 5,601,729 | 2/1997 | Bratten ................................... 210/783 |

*Primary Examiner*—Thomas M. Lithgow
*Attorney, Agent, or Firm*—Polster, Lieder, Woodruff & Lucchesi

[57] ABSTRACT

An apparatus and method for filtering particulate materials from a fluid stream wherein a dirty fluid stream is passed through a moveable filter media and the cleaned fluid stream is recirculated in part to form filter media by-pass preventing liquid curtains along the side edges of said filter media.

12 Claims, 3 Drawing Sheets

SEALING ARRANGEMENT FOR FILTER BELT

BACKGROUND OF THE INVENTION

The present invention relates to a sealing apparatus and method of sealing a moveable filtering medium and more particularly to an improved apparatus and method for filtering particulate materials from a dirty fluid stream which is passed through a flight of an endless filter medium belt or a strip of continuously fed filter medium with a portion of the recirculated clean fluid being utilized along the side edges of the filter medium for sealing.

In the prior art, U.S. Pat. No. 4,159,948, issued to William D. Crowe on Jul. 3, 1979, the broad principle of sealing the side edges of a filter belt with clean fluid recirculated from a reservoir below the filter medium treating sight for a dirty fluid stream is disclosed, attention being particularly directed to FIGS. 4 and 5 of this patent. However, in this patent the filter medium is advanced by an indexed pinch roller and the clean fluid is applied to the filter medium through spaced grooves in side edge sealing members immediately adjacent the side edges of the filter medium. The cleaning operation of the side edges in this patent is accomplished through a comparatively complex control arrangement during down-time of filtering operations. Further, a substantial wear on the filter medium side edges occurs through the recirculated water receiving grooved side edge sealing members and the accompanying pulling forces exerted on the filter medium by the pinch rollers. In later issued patents, such as U.S. Pat. No. 4,390,428, issued to Jack R. Bratten on Jun. 28, 1983, which teaches the utilization of an inflatable seal tube abutting the side edges of an endless filter belt, and U.S. Pat. No. 4,421,647, issued to Mark R. Estabrook et al on Dec. 20, 1983, which teaches sealing the side edges of filter medium by forcing the side edges of the medium into grooves, similar filter medium wear problems have occurred, along with the required utilization of comparatively complex structures to accomplish the medium sealing. Even in later U.S. Pat. No. 4,481,108 and U.S. Pat. No. 5,601,729, issued to Jack R. Bratten on Nov. 6, 1984 and Feb. 11, 1997, respectively, the use of disclosed wear inflicting, inflatable sealing tubes has been relied upon for sealing side edge sealing of filter medium, necessarily resulting in the aforedescribed undue wear of the filter medium. Also in these aforementioned patents the major problem of solids bypassing the medium from the dirty to the clean side of the system, occurs during the indexing movement of the filter medium when the sealing tubes have been deflated to permit filter medium movement.

The present invention recognizing certain of the problems recognized by the prior art, as well as problems created by prior art solutions, avoids the same with a unique structure and method which is straightforward and economical in construction, operation and maintenance-requiring a comparative minimum of parts and a comparative minimum of steps in resolving prior art difficulties. Further, the present invention uniquely utilizes the sealing machinery itself, to further supplement the novel sealing arrangement of the present invention.

Various other features and advantages of the present invention will become obvious to one skilled in the art upon reading the disclosure set forth herein.

BRIEF SUMMARY OF THE INVENTION

More particularly the present invention provides a fluid filter apparatus comprising: fluid receiving tank means including a first tank section to receive a dirty fluid to be filtered from a dirty fluid source and a successive second tank section to receive remaining clean fluid after it has been filtered; longitudinally extending porous filtering means having opposed side edges moveable in a plane between the first and second tank sections, the filtering means being adapted to separate out particulate matter from the dirty fluid as it is passed from the first tank section to the successive second tank section; fluid recirculating means to recirculate a portion of the clean fluid in the second tank section to the first tank section; fluid dispensing sealing means connected to the fluid recirculating means in spaced alignment with at least the opposed side edges of the porous filtering means so as to direct clean fluid extended curtains along the opposed side edges of the porous filtering means restricting dirty fluid into the first tank section from by-passing the filtering means by flowing around the opposed side edges of the filtering means thus insuring passage of the dirty fluid through the longitudinally extending porous filtering means; and, power means associated with the moveable filtering means and the fluid recirculating means to appropriately energize the same in accordance with a preselected adjustable program. In addition, the present invention provides a unique method of filtering particulate materials from a dirty fluid stream comprising: passing the dirty fluid stream from a dirty fluid receiving zone through a filtering zone to filter particulate materials from the dirty fluid stream; passing the cleaned fluid stream into a cleaned fluid receiving zone; and, recirculating a portion of the cleaned fluid from a cleaned fluid receiving zone back to the dirty fluid zone, forming extended clean liquid curtains along select side edges thereof to prevent the by-passing of dirty fluids around the filtering zone.

It is to be understood that various changes can be made by one skilled in the art in one or more of the several parts of the inventive apparatus described herein and in one or more of the several steps of the inventive method described herein without departing from the scope or spirit of the present invention. For example, the method and apparatus for discharging clean liquid fluid, as well as the discharge patterns can be modified in accordance with desired results.

BRIEF DESCRIPTION OF THE DRAWINGS

Referring to the drawings which disclose one advantageous embodiment of the present invention and a modification thereof.

DETAILED DESCRIPTION OF THE DRAWINGS

Figure 1:
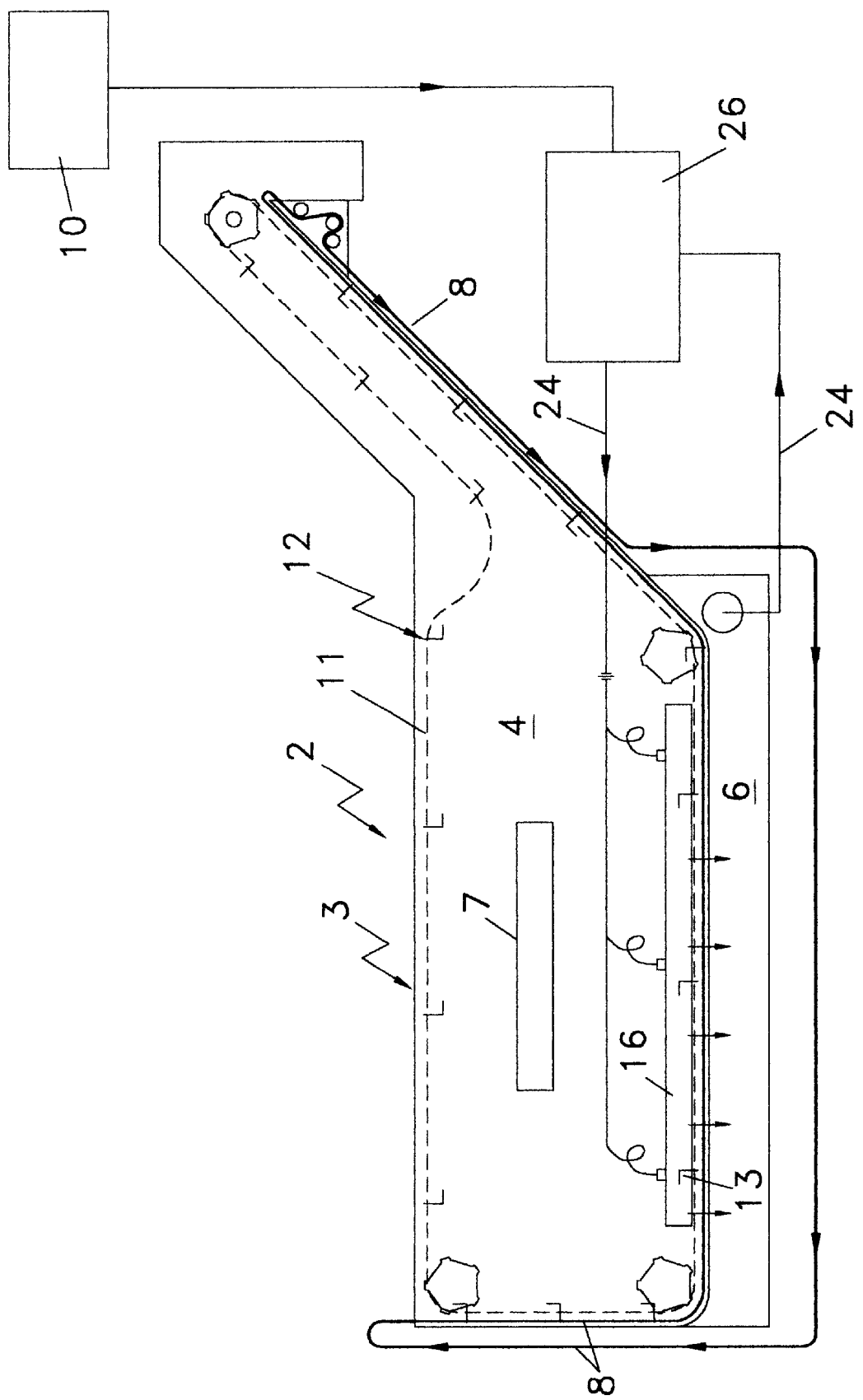
FIG. 1 is an overall schematic view of a typical particulate separating filter apparatus disclosing an endless filter belt with which the inventive sealing arrangement can be employed.
Figure 2:
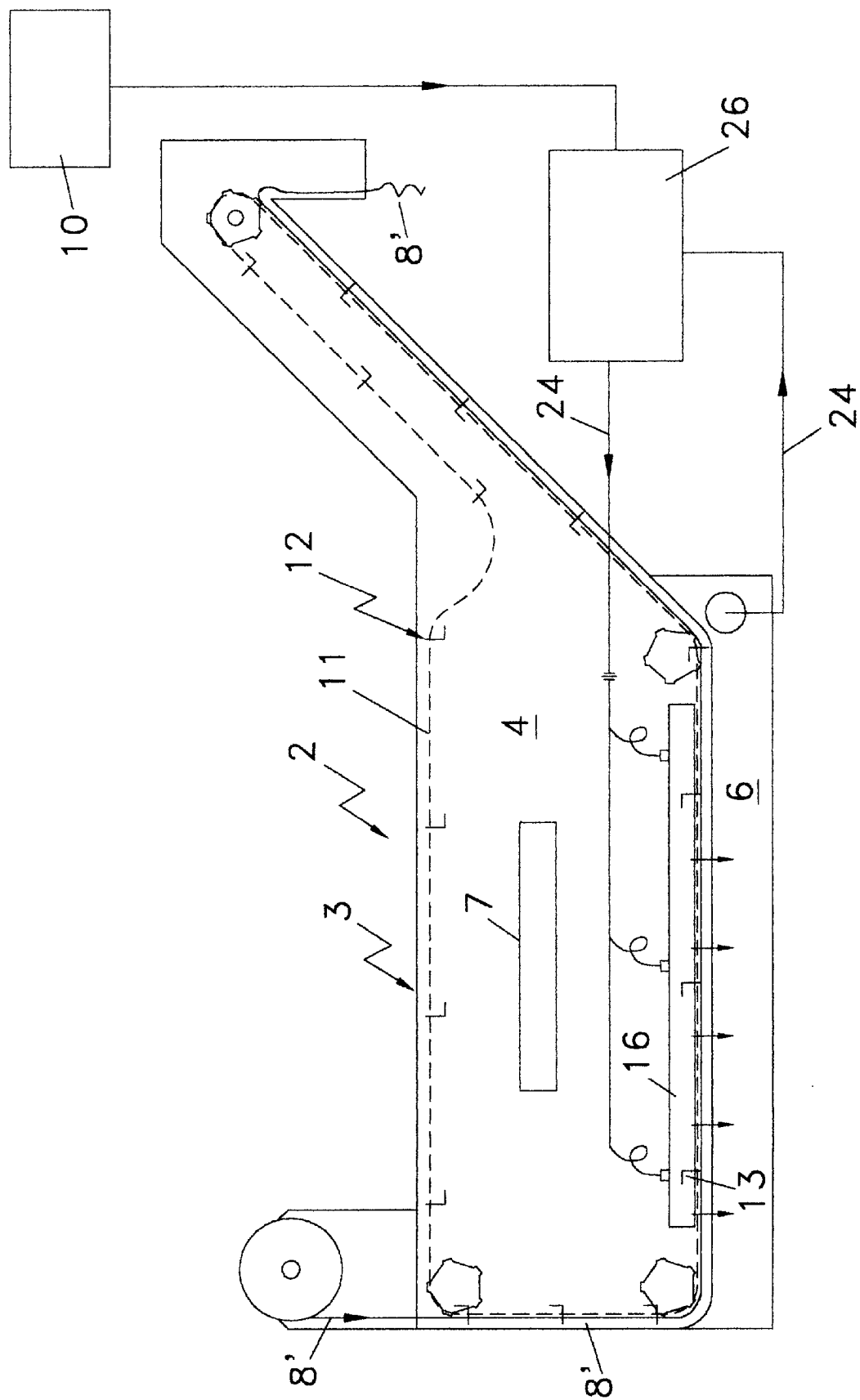
FIG. 2 is an overall schematic view of a similar typical particulate separating filter apparatus disclosing a continuously fed disposable filter medium with which the inventive sealing arrangement can be employed.

Referring to FIGS. 1 and 2 of the drawings, disclosed in each drawing is a typical particulate separating liquid filter apparatus for filtering out particulate materials from dirty liquid streams which, for example, can include particulate metallic particles gathered from machining operations by conventional metal working machines. Filter apparatus 2 includes a horizontally extending dirty liquid receiving tank 3 which incorporates an upper first section 4 disposed between the opposed side walls of tank 3 to receive a dirty liquid stream carrying particulate matter to be separated by a suitable filter medium described in more detail hereinafter. A lower second section 6 below first section 4 and also between the opposed side walls of tank 3 serves to receive the clean liquid after particulate matter has been separated from a dirty liquid stream introduced into the first section 4 through dirty liquid inlet 7. In FIG. 1 of the drawings, an endless filter medium strip 8, mounted on endless conveyor 11 schematically disclosed by reference numeral 11 in the schematic system of FIG. 1 of the drawings, can be seen more readily in the more detailed, enlarged cross-section disclosure of FIG. 3 of the drawings. A suitable porous filter medium can be utilized for filter medium strip 8, the filter medium being selected in accordance with the particulate matter to be removed and the liquid stream carrier industrially involved. It is to be understood, that instead of an endless filter medium 8, a continuous disposable filter medium 8 can be employed with the present invention, as can be seen in FIG. 2 of the drawings.

Figure 3:
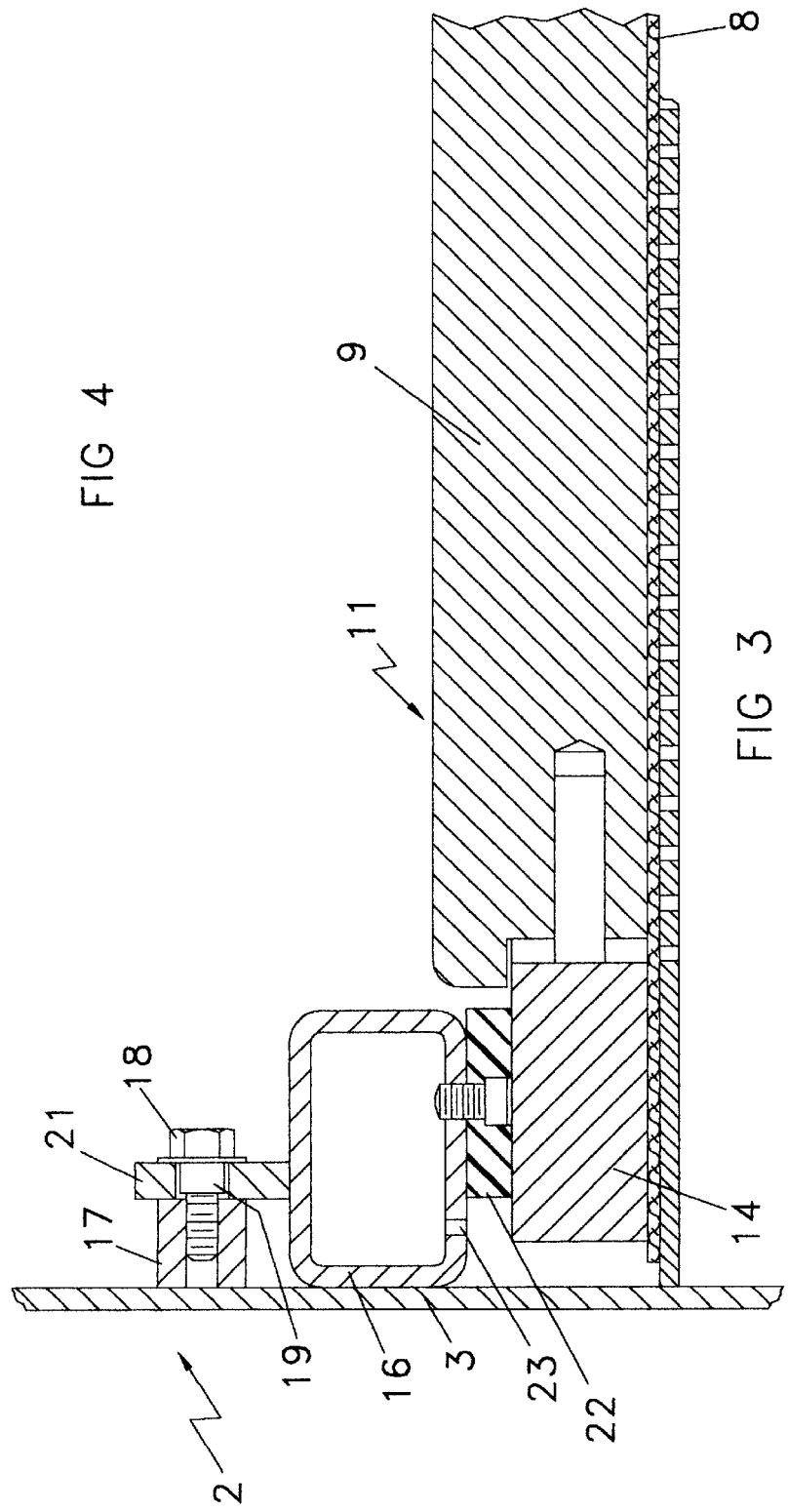
FIG. 3 is an enlarged cross-sectional detailed view of a portion of a filter apparatus such as schematically disclosed in FIGS. 1 and 2, disclosing only one of two mirror-image sides of the inventive sealing arrangement incorporated therein; and, FIG. 4 is an isometric view of a modified discharge orifice arrangement for the liquid conduit of FIG. 3.

As can be seen in FIG. 3 of the drawings, adjacent and parallel rungs 9 (only one of which is disclosed) extend between a spaced pair of endless chains 14 of an endless conveyor 11. In the embodiments disclosed in FIGS. 1 and 2 of the drawings, each endless conveyor 11 includes an upper flight 12 and a lower flight 13, with the lower flight 13 traveling between the first or dirty liquid section 4 of receiving tank 3 and the second or clean liquid section 6 of receiving tank 3. It is to be noted that in the embodiments disclosed, the bottoms of the adjacent parallel rungs 9 are treated with a gritted engaging surface so as to engage with the upper surfaces of each of the filter mediums 8 (FIG. 1) and 8' (FIG. 2) to move the respective filter mediums 8 an 8' therealong. It is further to be noted that each of rungs 9 can be of a suitable plastic or fiberglass material with a course or gritted bottom as aforedescribed. The spaced endless chains 14 of endless conveyor 11 are disposed adjacent opposed side walls of the first or upper section 4 of receiving tank 3 with spaced rung members 9 fixed to and extending between endless chains 14. The upper and lower flights of endless conveyor 11 in the embodiments disclosed pass between and through the first section 4 of the tank 3. However, it is to be understood that other arrangements of the flights of the endless conveyor could be utilized.

As can be seen in FIGS. 1 and 2 of the drawings, a pair of longitudinal, horizontally extending liquid conduits 16 (only one of which can be seen since only one mirror-image side wall is disclosed) are attached to the opposed mirror-image side walls of the first tank section 4 of tank 3 to extend in substantially spaced parallel relation to each other above opposite side edges of moveable filter mediums 8 and 8'. As can be seen more clearly in FIG. 3, each fluid conduit 16 is suspended from a plurality of horizontally and linearly spaced stud wall mounting assemblies 17 fastened to the inner faces of opposed side walls of tank 3. The spaced stud wall mounting assemblies 17, each have an adjustable, threaded shoulder bolt 18 engaging the distal end thereof to provide a slot between the shoulder of bolt 18 and stud 17 to engage loosely with a slot 19 in a first longitudinally and horizontally extending baffle 21 adjacent one extremity thereof. The other end of baffle 21 is fastened to the outside wall face of fluid conduit 16 along the upper portion thereof so that each conduit floatingly engages in slots 19. A second longitudinally and horizontally extending baffle 22 is fastened to each of floatingly mounted liquid conduits 16 along the outer wall face of the liquid conduit to floatingly abut endless conveyor chain 14. In this regard, it is to be noted that each of the longitudinally and horizontally extending conduits 16 with their respective upper and lower baffle members 21 and 22 respectively form one of a pair of solid physical barriers spaced from opposed side wall of receiving tank 3 to physically restrain dirty liquid introduced into the first upper tank 4 from by-passing the filter medium 8 by flowing around the side edges thereof.

As can be seen in FIG. 3, the floating liquid conduits 16 are each provided along the bottom portion thereof with a series of spaced fluid outlet orifices 23 which are arranged to direct an extended liquid curtain of clean recirculated liquid against each of the opposed side edges of filter media 8 or 8' (only one of these spaced orifices 23 being disclosed in FIG. 3). This extended liquid curtain serves as a further barrier, besides the aforedescribed solid barrier, to restrain dirty liquid introduced into the tank section 4 from by-passing filter medium 8 or 8' (as the case might be) by flowing around the side edges of filter medium 8 or 8' and flowing into the otherwise clean fluid tank section 6.

As can be seen in FIGS. 1 and 2 of the drawings, a portion of the clean fluid is recirculated by conduit 24 from the vacuum clean fluid section 6 with remainder of clean fluid being recirculated for reuse at an industrial machine source. To accomplish the timed recirculation of cleaned liquid and the timed movement of endless conveyor 11 an appropriate power source 26 is provided. Power source 26 is disclosed schematically in FIGS. 1 and 2 and can include (but not shown) an appropriately selected liquid pump connected to recirculating conduit 24, a drive motor connected to endless drive chain 14 and preselectively set adjustably programmed timing controls for the liquid pump and drive motor. As clean liquid runs low, additional clean liquid can be furnished from clean liquid supply 10.

Figure 4:
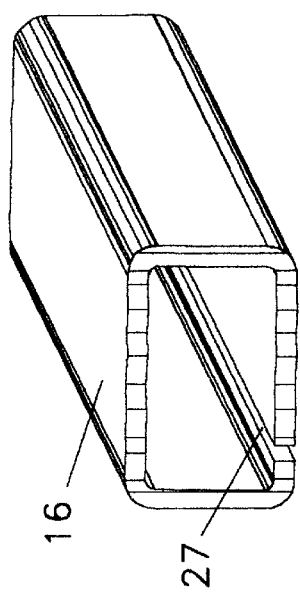

As can be seen in FIG. 4 of the drawings, the discharge orifice for fluid conduits 16 can be in the form of extended longitudinal slits 27 and that the discharge orifices can include adjustable mechanism to provide venturi-like discharge arrangements.

In accordance with the present invention, a unique method of filtering a dirty fluid stream is provided which includes the steps of passing the particulate carrying dirty fluid stream from a dirty fluid receiving zone (first tank section 4) through a filtering zone (filter medium 8 or 8') to filter particulate contaminants from the dirty fluid stream; passing the cleaned fluid stream into a cleaned fluid receiving zone (second section 6); and recirculating a portion of the cleaned fluid from the cleaned fluid receiving zone back to the dirty fluid zone, forming extended liquid curtains directed against the side edges of the filtering zone to prevent by-passing of dirty fluids around the filtering zone. In addition, the present invention provides for the liquid forming curtain means in the dirty fluid to be arranged along the zone to further physically prevent dirty fluid from bypassing the dirty fluid zone and being introduced into the clean fluid receiving zone.

The invention claimed is:

1. A fluid filter apparatus comprising: fluid receiving tank means having opposed side walls and including a first tank section to receive a dirty fluid to be filtered from a dirty fluid source and a successive second tank section to receive remaining clean fluid after it has been filtered; longitudinally extending porous filtering means having opposed side edges moveable in a plane between said first and second tank sections, said filtering means being adapted to separate out particulate matter from said dirty fluid as it is passed from said first tank section to said successive second tank section; fluid recirculating means to recirculate a portion of said clean fluid in said second tank section; to said first tank section, fluid dispensing sealing means connected to said fluid recirculating means in removed, spaced alignment with at least said opposed side edges of said porous filtering means so as to provide and direct clean fluid extended curtains toward and along said opposed side edges of said porous filtering means, said clean fluid extended curtains restricting dirty fluid introduced into said first tank section from by-passing said porous filtering means by flowing around said opposed side edges of said porous filtering means thus insuring passage of said dirty fluid through said longitudinally extending porous filtering means; and, power means associated with said moveable filtering means and said fluid recirculating means to appropriately energize same in accordance with a preselected adjustable program.

2. The fluid filter apparatus of claim 1, said first and second tank sections being disposed one after the other in the same tank, said porous filtering means being mounted on an endless conveyor, said endless conveyor including an upper and lower flight moveable in said first section of said tank means above said second tank section.

3. The fluid filter apparatus of claim 2, said endless conveyor including a pair of spaced longitudinally extending laterally spaced endless chains disposed in said first section of said tank, each chain being adjacent one of each of said opposed side walls of said tank with a plurality of flight members connectively extending therebetween to movingly support said longitudinally extending porous filtering means thereon; said power means including a programmable drive motor to drive said endless conveyor with said filtering means supported thereon in an indexable fashion.

4. The fluid filter apparatus of claim 1, said fluid dispensing sealing means including a pair of longitudinally extending fluid conduits having fluid dispensing outlets disposed therein, said conduits being attached to said opposed side walls of said tank to extend substantially parallel to each other and spaced above said opposed side edges of said moveable filtering means, said conduits being connected to said recirculating means with said fluid dispensing outlets being in spaced alignment with said opposed side edges of said filtering means to direct said fluid curtain thereon, said power means including a power pump connected to said recirculating means creating a vacuum in said second section of said receiving tank and directing a portion of clean liquid under preselected pressure from said second section of said tank to said fluid dispensing conduits.

5. The fluid filter apparatus of claim 4, said fluid dispensing conduits each including a series of spaced apertures longitudinally extending along one portion thereof and positioned to direct a curtain of clean recirculated fluid against said opposed side edges of said moveable porous filtering means.

6. The fluid filter apparatus of claim 4, said fluid dispensing conduits, each including a longitudinally extending verturi-like slit extending along the bottom portion thereof to direct a high velocity sheet-like curtain of clean recirculated liquid against said opposed side edges of said moveable porous filtering means.

7. The fluid filter apparatus of claim 1, said fluid dispensing sealing means being floatingly mounted to said opposed side walls of said tank means.

8. The fluid filter apparatus of claim 7, including mounting means for floatingly mounting said fluid dispensing sealing means, said mounting means having a plurality of spaced stud assemblies fastened to the inner faces of said opposed side walls of said tank means and a pair of first longitudinally extending barrier strip means, each of which is fixed to an outer face of each of said longitudinally extending conduits to slidably and thus floatingly engage with said stud assemblies.

9. The fluid filter apparatus of claim 8, said mounting means for floatingly mounting said fluid dispensing sealing means further including a pair of second longitudinally extending barrier strip means, each of which is fixed to an outer face or each of said longitudinally extending fluid conduits opposite said first barrier strip means to engage with a portion of said power means associated with said filtering means to complete a physical barrier which includes said fluid conduits and said first and second barrier strips fixed thereto, said physical barrier being substantially adjacent said fluid extended curtain to further restrict dirty fluid introduced into said first tank section from by-passing said filter means by flowing around the side edges thereof.

10. The fluid filter apparatus of claim 1, said porous filtering means being in endless belt form.

11. The fluid filter apparatus of claim 1, said porous filtering means being in continuously fed disposable form.

12. A liquid filter apparatus for filtering out particulate materials from a dirty liquid stream comprising a longitudinal, horizontally extending liquid tank including a first upper tank section disposed between opposed side walls of said tank to receive a dirty fluid to be filtered from a dirty fluid source and a second lower tank section disposed between opposed side walls below said first tank section to receive clean fluid after it has been filtered; a longitudinally extending porous filter medium strip having opposed side edges; a power driven endless conveyor structure disposed in said receiving tank for moveably supporting said filter media between said first and second tank sections, said endless conveyor structure including a pair of spaced endless chains disposed adjacent said opposed side walls of said tanks and having horizontally extending media support rung members fixed to and extending therebetween with the lower flight of said endless conveyor passing between and through said first and second tank sections and the lower flight passing through said lower tank section; said rung members having a gritted engaging bottom surface for enhancing movement of said filter medium strip in a horizontal filtering plane to travel between said first upper and second lower tank sections of said tank; a pair of longitudinal, horizontally extending liquid conduits floatingly attached to said opposed side walls of said first tank section of said tank to extend in substantially spaced parallel relation to each other above opposite side edges of said moveable filter media, said fluid conduits being suspended from a plurality of horizontally and linearly spaced study mounting assemblies fastened to the inner faces of said opposed side walls, said spaced stud wall assemblies having baffle receiving slots at the distal end thereof; a first longitudinal and horizontally extending baffle member fastened to each of said liquid conduits at the upper portion thereof to floatingly engage in said slots; a second longitudinally extending baffle member fastened to each of said liquid conduits at the lower portion thereof to floatingly abut said endless chain, each of said longitudinally and horizontally extending conduits with respective upper and lower baffle members forming a pair of solid physical barriers spaced from opposed side walls of said receiving tank to restrain dirty liquid into said first tank section from by-passing said filter media by flowing around said side edges thereof, said floating liquid conduits being provided with liquid outlets at the bottom thereof to direct liquid curtains of clean recirculated liquid against the opposed side edges of said moveable filter media and serve as a further barrier to restrain dirty liquid from by-passing said filter media by flowing around said side edges of said filter media; and, a liquid pump recirculating system connected between said second section of said tank and said floating liquid curtain forming conduits to create a vacuum in said second section of said tank and pump a portion of said clean liquid to said curtain forming liquid conduits.

* * * * *

UNITED STATES PATENT AND TRADEMARK OFFICE
CERTIFICATE OF CORRECTION

PATENT NO. : 6,093,315
DATED : July 25, 2000
INVENTOR(S) : Thomas M. Lithgow

It is certified that error appears in the above-indentified patent and that said Letters Patent is hereby corrected as shown below:

Column 5, line 7, the semi-colon after "tank section", first appearance, should be deleted and should be inserted after "tank section", second appearance, column 5, lines 7 and 8.

In Column 5, line 60 correct "verturi-like" to read --- venturi-like --- ; and,

In Column 6, line 55, correct "study" to read --- stud ---.

Signed and Sealed this

Seventeenth Day of April, 2001

Attest:

NICHOLAS P. GODICI

Attesting Officer

Acting Director of the United States Patent and Trademark Office